Feb. 1, 1966 E. EVALDS ETAL 3,233,126

DIFFERENTIAL CONTROLLER

Filed Oct. 14, 1963 2 Sheets-Sheet 1

JOHN J. COYNE
EGILS EVALDS
INVENTORS

BY Robert L. Marben
ATTORNEY

JOHN J. COYNE
EGILS EVALDS
*INVENTORS*

BY Robert L. Marlow
ATTORNEY 3,233,126

DIFFERENTIAL CONTROLLER

Egils Evalds and John J. Coyne, Philadelphia, Pa., assignors to Robertshaw Controls Company, Richmond, Va., a corporation of Delaware Filed Oct. 14, 1963, Ser. No. 315,826
15 Claims. (Cl. 307—88.5)

The invention presented herein relates to differential circuits for bridge circuits and more particularly to differential circuits for capacitance type bridge circuits.

Bridge circuits are used extensively in the field of instrumentation. For example, a bridge circuit may be set up so only its legs are varied to determine the point at which a second leg or sensing leg must be varied to balance the bridge. The sensing leg can be a capacitor that may be varied in a number of ways such as changing the space between the electrodes, the area of the electrodes, the quantity of material between the electrodes or the composition of the material. The bridge circuit may form the input circuit for an on-off controller used to control the variable condition monitored by the sensing leg. It is important in many cases where the controller is very sensitive that additional capacitance be added to the bridge circuit to increase the dead-band of the controller. This is necessary to prevent undue cycling of the system responding to the controller since any undue cycling may cause extensive wear or premature breakdown of one or more of the system components such as a motor or valve.

Adjustment of the dead-band by the addition of capacitance to the bridge circuit by manual actuation of switches or by connection of additional capacitors via the contacts of a relay controlled by the output of the controller is objectionable in view of the time lag involved, attention required of an operator and variation in the capacitance introduced into the circuitry caused by inconsistent actuation of the switches or contacts used.

It is an object of this invention to provide a differential circuit which is operative in response to voltage levels to increase the differential of a capacitance type bridge circuit.

Another object of this invention is to provide a differential circuit for a capacitance type bridge circuit which does not require any moving contacts, mechanical switches or electro-mechanical switches.

A further object of this invention is to provide a differential circuit for a capacitance type bridge which uses diode switching for connecting additional capacitance in the bridge.

Still another object is to provide an on-off controller using a capacitance type bridge circuit having a differential circuit using diode switching for connecting additional capacitance in the bridge to vary the dead-band of the controller.

Other objects and advantages of the invention will become apparent from consideration of the specification and claims taken together with the accompanying drawing.

Figure 1:
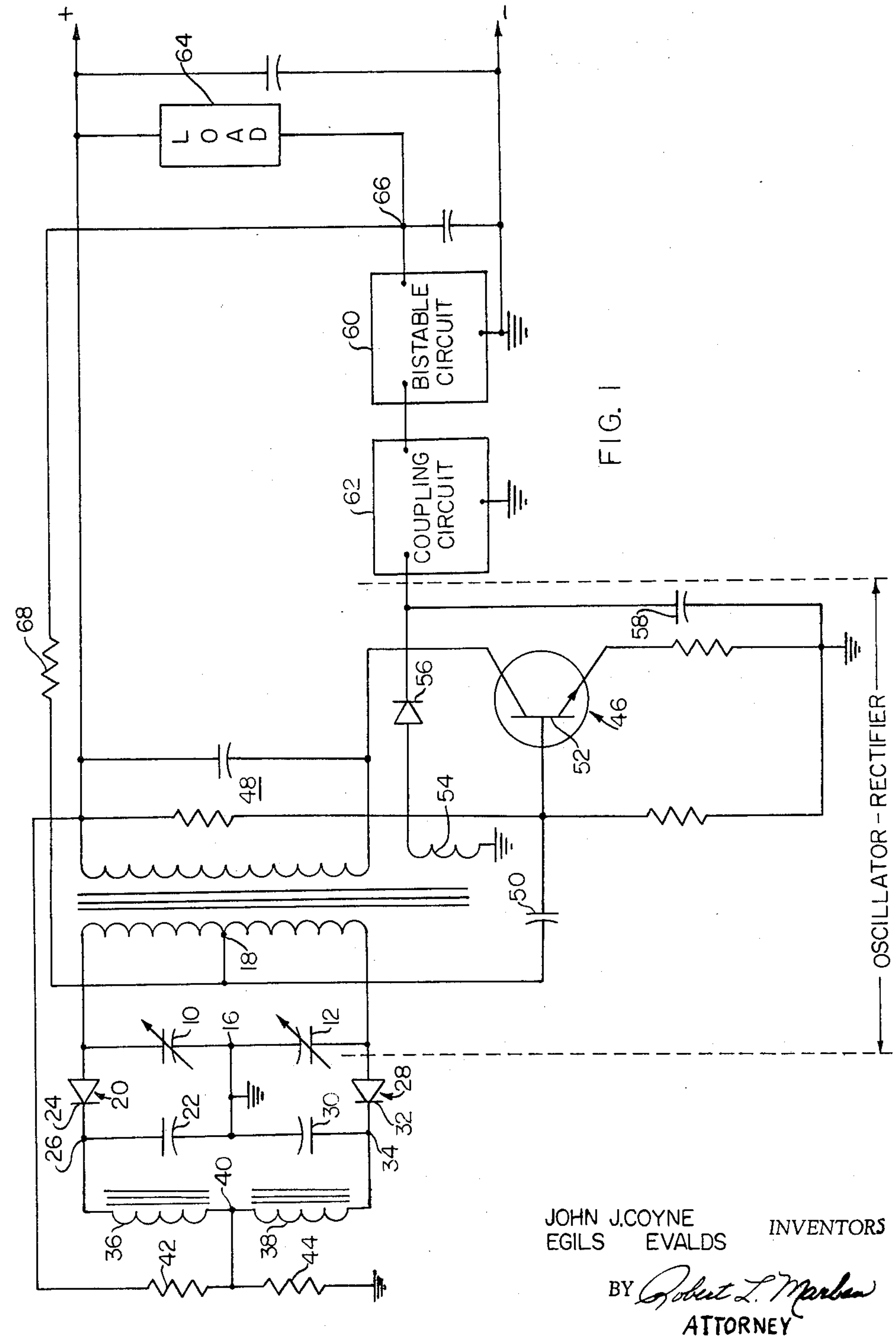
FIG. 1 is a circuit diagram of capacitance controlled on-off controller embodying the invention.

Referring to FIG. 1 of the drawing, there is shown an on-off controller embodying the invention. Consideration will first be given to the capacitance bridge circuit portion, the differential circuit connected therewith and its manner of operation. An inductance-capacitance type bridge is illustrated though the invention is applicable to any capacitance type bridge which, of course, is energized by an electric oscillating signal such as an RF signal. Broadly, the function of the differential circuit is to connect additional capacitance in parallel with one or more capacitance legs of the bridge. The inductance-capacitance bridge shown in FIG. 1 includes two series connected capacitance legs 10 and 12 connected across winding 14. The output of the bridge appears across the connection 16 common to the two capacitance legs and the connection 18 intermediate the ends of the winding 14. The connection 18 is shown as a center-tap. One of the capacitance legs 10 and 12 may be the set capacitance, while the other is the sensing or variable capacitance. When the variable or sensing capacitance is on one side of the balance point of the bridge, the connection 18 will be positive with respect to the ground connected connection 16 and will be negative with respect to the connection 16 when it is on the other side of the bridge balance.

The differential circuit includes a diode 20 and series connected capacitance 22 which are both connected across leg 10. The capacitance 22 is connected to the ground connection 16, while diode 20 is connected with its cathode 24 connected to the connection 26 common to the diode 20 and capacitance 22. A similar circuit is shown connected across the capacitance leg 12. Thus, a circuit loop including capacitance leg 12, a diode 28 and a capacitance 30 is formed. Cathode 32 of diode 28 is connected to the connection 34 common to the diode 28 and capacitance 30. The capacitance 30 is connected to the ground connection 16. An inductor or choke coil 36, which presents a high impedance to the electrical alternating signal used to drive the bridge circuit, has one end connected to the connection 26. A second inductor or choke coil 38 is similarly connected to connection 34. The other ends of inductors 36 and 38 are connected together to form a common connection 40. The connection 40 is connected to a positive D.C. voltage which is effective to reverse bias the diodes 20 atnd 28. In the circuit shown, the positive D.C. reverse bias voltage is obtained from a voltage divider comprising two equal series connected resistors 42 and 44 connected to the positive side of a D.C. voltage supply (not shown).

Figure 2:
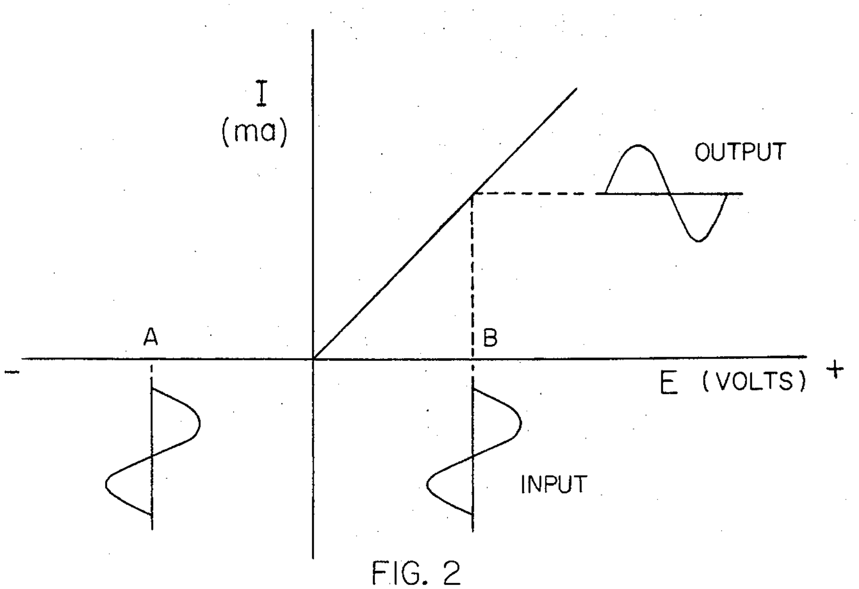
FIG. 2 is a typical diode transfer characteristic used to explain the operation of the circuit shown in FIG. 1.

Referring now to FIG. 2, which shows a typical diode transfer characteristic, it can be seen that with a reverse bias applied to establish operating point A for diodes 20 and 28, an electrical alternating signal for the bridge having a peak voltage that is less than the reverse bias will not be passed by either diode 20 or diode 28. Therefore, with only the reverse bias voltage applied to the bridge circuit, capacitances 22 and 30 do not influence the operation of the bridge. However, by applying a forward bias to diodes 20 and 28 sufficient to establish operating point B on the transfer characteristic curve, it is apparent that the entire electrical alternating signal will be passed by diodes 20 and 28. With such a forward bias to diode 20 and diode 28, the capacitances 22 and 30 are effectively switched in parallel with capacitance legs 10 and 12, respectively. The inductors 36 and 38, of course, present a high impedance to the alternating signal passed by diodes 24 and 28, respectively.

FIG. 1 of the drawing shows an on-off controller embodying the invention. Thus, the bridge circuit described is used as the feedback circuit of an oscillator which includes a transistor 46 connected in common emitter configuration. A parallel tuned tank circuit 48 is connected between the collector and the positive side of the D.C. power supply (not shown). The tank circuit 48 is inductively coupled to the inductance-capacitance bridge to provide the electrical alternating input signal for the bridge. The output of the bridge is coupled to the transistor 46. With the bridge circuit thus connected as a feedback circuit, a positive feedback signal is supplied to the transistor 46 when the bridge is unbalanced in one direction and a negative feedback signal is supplied to the transistor 46 when the bridge is unbalanced in the opposite direction. When a positive feedback signal is supplied, oscillations will be established and the circuit functions as an oscillator with the amplitude of the oscillations varying in proportion to the degree of positive feedback or bridge unbalance.

A D.C. signal is obtained from the oscillator via a winding 54 coupled to the tank circuit 48. The winding 54 is connected in series with a diode 56 which serves to rectify the alternating signal induced in the winding 54. The rectified signal is smoothed out by a capacitor 58 connected across the series connected diode 56 and winding 54. A D.C. signal appearing across capacitance 58 is thus indicative of oscillation or bridge unbalance.

The D.C. signal developed by the oscillator-rectifier portion of the control circuit is coupled to a bistable circuit 60 via a coupling circuit 62. The coupling circuit 62 may be a direct coupling type circuit or may be a stage or two of amplification. The particular coupling circuit used is considered a matter of design. The bistable circuit 60 may also take on one of several well known forms such as a Schmitt trigger (emitter coupled bistable switch). A Schmitt trigger uses two transistors, one of which is cut off when there is no input signal to the Schmitt trigger, while the other is conducting fully. When an input signal is applied to the Schmitt trigger, the transistors reverse their mode of operation. Such operation is typical of any bistable circuit of a Schmitt trigger or multi-vibrator type. A load 64, which, for example, may be the coil of a relay, is connected between the bistable circuit 60 and the positive side of the D.C. power supply (not shown).

It is desired that the differential circuit connected to the inductance-capacitance bridge be activated to add the differential capacitors in circuit when the sensing capacitance attains the value desired to cause the desired current flow in the load circuit. Thus, the differential capacitances 20 and 30 are added by the differential circuit and differ by a given amount and in the correct direction so the sensing capacitance leg will have to change this same amount before the condition of the bridge needed to cause the bistable circuit 60 to change its state of operation is established. The addition of the differential capacitances 20 and 30 thus prevent the controller from cycling between on and off due to slight variations in the capacitance of the sensing capacitance leg.

The output transistor of a Schmitt trigger will be turned off when oscillations of sufficient magnitude are present to provide a signal great enough to turn on the input transistor of a Schmitt trigger. Thus, no current flow in the load 64 is indicative of the desired bridge condition. It is at this time when it is desirable that the differential circuit come into play. With no current flowing through load 64 the full D.C. voltage provided by the D.C. power supply is present at the output 66 of the bistable circuit 60. The output 66 is connected to the diode 20 and diode 28 via a current limiting resistor 68, the connection 18 and the two halves of the winding 14. A connection could be made from the resistor 68 to each of the anodes of diodes 20 and 28, however, by utilizing the winding 14, the application of the D.C. voltage to the diodes 20 and 28 is simplified. Thus, with oscillations of sufficient magnitude present, the full D.C. power supply voltage is applied immediately to the diodes 20 and 28 by the action of the bistable circuit 60 to forward bias the diodes and effectively place capacitances 22 and 30 in parallel with capacitance legs 10 and 12, respectively, to increase the dead-band of the controller. This forward bias voltage is removed when the sensing capacitance takes on a value to balance the bridge causing the oscillation to cease and thus remove the signal applied to the input transistor of the Schmitt trigger causing it to be cut off and the output transistor to conduct. Current then flows through the load 64 causing most of the voltage of the D.C. power supply (not shown) to be applied across the load 64. The potential at point 66 is thus reduced so the diodes 20 and 28 are under the control of the reverse bias voltage supplied from resistor 44.

While the differential circuit shown in FIG. 1 is active to add capacitance to each leg of the inductance-capacitance bridge, it is apparent that differential operation of the bridge can be established by adding capacitance to only one of the legs. However, it has been found that by adding capacitance to each of the capacitance legs, the influence of stray capacitance and zero shift is reduced. Further, if the circuit is expected to operate properly at any ambient temperature within a wide range, the use of the differential circuit shown in FIG. 1 enhances the temperature stability of the circuit. The characteristic of a diode will change with temperature. Therefore, by using a diode with each differential capacitance, any change in the diode characteristics due to temperature will be reflected in both of the capacitance legs so any change in the diodes will have no effect on the bridge and thus improve the temperature sensitivity of the circuit.

Figure 3:
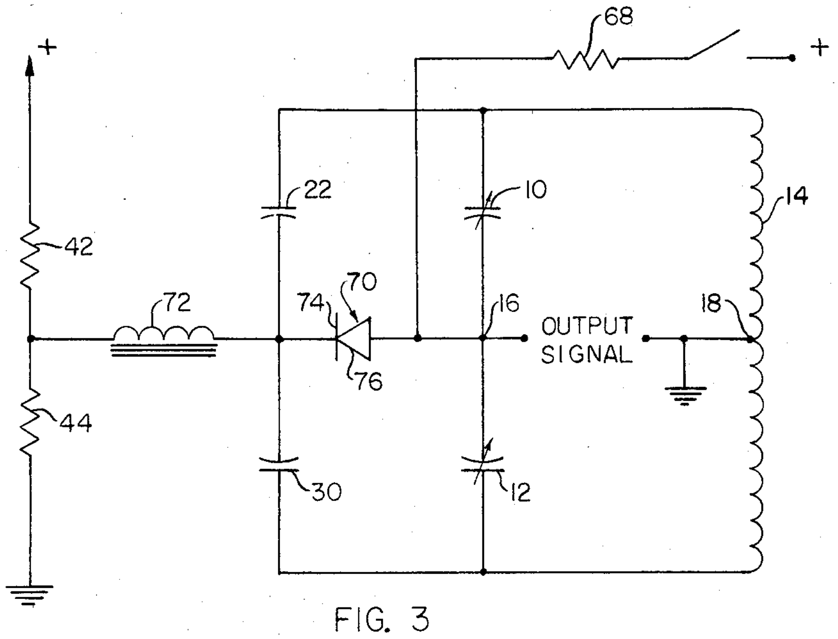
FIG. 3 is a circuit diagram of a capacitance type bridge having a differential circuit embodying the invention.

FIG. 3 is another embodiment of the invention showing a simplified form of the differential circuit for use with a capacitance type bridge. It can be used where it is not necessary that one side of the capacitance legs 10 and 12 be grounded. The same reference numbers are applied to elements corresponding to those shown in the embodiment of FIG. 1. A capacitance-inductance bridge is shown having a winding 14 and two capacitance legs 10 and 12. The output signal from the bridge appears between the connection 16 common to the series connected legs 10 and 12 and the connection 18 intermediate the ends of winding 14. The circuit differs from that shown in FIG. 1 in that the ground connection is made to connection 18 instead of 16.

The portion of the circuit providing the differential action includes a diode 70 connected in series with an inductor or choke coil 72. The cathode 74 of diode 70 is connected to one end of the coil 72 and its anode 76 is connected to the connection 16. The other end of the coil 72 is connected to a positive D.C. voltage supplied from two series connected resistors 42 and 44. The resistors 42 and 44 are connected across a D.C. power supply (not shown). The coil 72 is connected to the connection common to the resistors 42 and 44 causing the diode 70 to be reverse biased by the voltage appearing across resistor 44. The differential capacitance 22 to be connected in parallel with leg 10 by the action of the differential circuit is connected across both the capacitance leg 10 and diode 70. Similarly, the differential capacitance 30 is connected across both the capacitance leg 12 and diode 70. The forward bias voltage needed to overcome the reverse bias voltage is applied to the anode 76 of diode 70 via the current limiting resistor 68. A switch is shown in the circuit which connects diode 70 with the forward bias voltage source (not shown) to indicate that the forward bias is selectively applied to the diode 70. Thus, with no forward bias applied to the diode 70, the voltage presented by resistor 44 is effective to reverse bias the diode 70 to keep the capacitors 22 and 30 from influencing the operation of the bridge circuit. Upon application of the forward bias voltage to the diode 70 via the resistor 68, the reverse bias voltage is overcome and diode 70 is biased in the forward direction allowing the capacitances 22 and 30 to pass the alternating signal used to energize the bridge circuit to provide the desired differential operation.

Referring to FIG. 1, it is obvious that the diodes 20 and 28 can be reversed and the forward biasing voltage then applied to the connection 40 and the reverse biasing voltage applied to the connection 18. It is also obvious that diodes 20 and 28 can be reversed in the embodiment shown in FIG. 1 and diode 70 reversed in the embodiment shown in FIG. 3 with the application of the biasing voltages remaining the same. With this change in the circuits the differential capacitors will be switched into the bridge circuit by the lower biasing voltage which will forward bias the diodes when there is load current through the load circuit 64 and will be isolated from the bridge circuit by the diodes when there is no load current through the load circuit since the diodes will then be reverse biased by the voltage applied via resistor 68.

Other modifications of the embodiments shown and described will readily occur to those skilled in the art. Accordingly, the scope of the invention presented herein is intended to be limited only as defined in the appended claims which should be accorded a breadth of interpretation consistent with this specification.

What is claimed is:

1. A differential circuit for a bridge circuit energized by an electrical alternating input signal and having a capacitance leg the combination comprising a circuit loop including the capacitance leg, a capacitor and a diode; means providing two direct current voltages differing in magnitude with the larger voltage provided for use as a forward bias voltage for said diode; means applying one of said direct current voltages to one side of said diode; and means responsive to a predetermined condition of the bridge controlling the application of the other of said voltages to the other side of said diode whereby said diode is forward biased to effectively connect said capacitor in parallel with the capacitance leg dependent upon the condition of the bridge.

2. A differential circuit for a bridge circuit energized by an alternating input signal and having a capacitance leg the combination comprising a circuit loop including the capacitance leg, a capacitor and a diode; a biasing circuit for said diode including a choke coil connected to said diode and said capacitor; means providing two direct current voltages which differ in magnitude with the larger voltage provided for use as a forward bias voltage for said diode; means connecting one of said direct current voltages to one end of said biasing circuit and means responsive to a predetermined condition of the bridge controlling the application of the other of said voltages to the other end of said biasing circuit whereby said diode is forward biased to effectively connect said capacitor in parallel with the capacitance leg dependent upon the condition of the bridge.

3. A differential circuit for a capacitance bridge energized by an alternating electrical input signal and having two capacitance legs connected in series the combination comprising a first circuit loop including one of the capacitance legs, a capacitor and a diode; a second circuit loop including the other of said capacitance legs, a capacitor and a diode; means providing two direct current voltages which differ in magnitude; means applying one of said direct current voltages to one side of the diode of said first circuit loop and to one side of the diode of said second circuit loop; and means responsive to a predetermined condition of the bridge controlling the application of the other of said voltages to the other side of the diode of said first circuit loop and to the other side of the diode of said second circuit loop whereby the diodes of said first circuit loop and said second circuit loop are forward biased dependent upon the condition of the bridge to effectively connect the capacitor and capacitance leg of said first circuit loop in parallel and the capacitor and capacitance leg of said second circuit loop in parallel.

4. A differential circuit for a capacitance bridge energized by an alternating electrical input signal and having two capacitance legs connected in series the combination comprising a first circuit loop including one of the capacitance legs, a capacitor and a diode; a second circuit loop including the other of said capacitance legs, a capacitor and a diode; a biasing circuit for the diode of said first circuit loop including a choke coil connected to the diode and a capacitor of said first circuit loop; a biasing circuit for the diode of said second circuit loop including a choke coil connected to the diode and capacitor of said second circuit loop; means providing two direct current voltages which differ in magnitude; means applying one of said direct current voltages to one end of the biasing circuits of said first and second circuit loops; and means responsive to a predetermined condition of the bridge controlling the application of the other of said direct current voltages to the other end of the biasing circuits of said first and second circuit loops whereby the diodes of said first and second circuit loops are forward biased dependent upon the condition of the bridge to effectively connect the capacitor and capacitance leg of said first circuit loop in parallel and the capacitor and capacitance leg of said second circuit loop in parallel.

5. A differential circuit for a bridge circuit energized by an alternating input signal and having a capacitance leg with one end connected to the output for the bridge the combination including a series circuit including a capacitor and a diode connected in parallel with the capacitance leg with said diode connected to the one end of the capacitance leg; means providing two direct current voltages differing in magnitude; means applying one of said direct current voltages to one side of said diode; and means responsive to a predetermined condition of the bridge controlling the application of the other of said voltages to the other side of said diode whereby said diode is forward biased dependent upon the condition of the bridge to effectively connect said capacitor in parallel with the capacitance leg.

6. A differential circuit for a bridge circuit energized by an alternating input signal and having a capacitance leg with one end connected to the output for the bridge the combination including a series circuit including a capacitor and a diode connected in parallel with the capacitance leg with said diode connected to the one end of the capacitance leg; a biasing circuit for said diode including a choke coil connected to said diode and said capacitor; means providing two direct current voltages which differ in magnitude; means connecting one of said direct current voltages to one end of said biasing circuit and means responsive to a predetermined condition of the bridge controlling the application of the other of said voltages to the other end of said biasing circuit whereby said diode is forward biased dependent upon the condition of the bridge to effectively connect said capacitor in parallel with the capacitance leg.

7. A differential circuit for a capacitance bridge energized by an electrical alternating input signal and having two capacitance legs connected in series the combination including a first circuit loop including one of the capacitance legs, a capacitor and a diode; a second circuit loop including the other of the capacitance legs, a capacitor and said diode; means providing two direct current voltages which differ in magnitude; means applying one of said direct current voltages to one side of said diode; and means responsive to a predetermined condition of the bridge controlling the application of the other of said voltages to the other side of said diode whereby said diode is forward biased dependent upon the condition of the bridge to effectively connect the capacitor and capacitance leg of said first circuit loop in parallel and the capacitor and capacitance leg of said second circuit loop in parallel.

8. A differential circuit for a capacitance bridge energized by an electrical alternating input signal and having two capacitance legs connected in series the combination including a first circuit loop including one of the capacitance legs, a capacitor and a diode; a second circuit loop including the other of the capacitance legs, a capacitor and said diode; means providing two direct current voltages which differ in magnitude; a biasing circuit for said diode including a choke coil connected in series with said diode; means connecting one of said direct current voltages to one end of said biasing circuit; and means responsive to a predetermined condition of the bridge controlling the application of the other of said voltages to the other end of said biasing circuit whereby said diode is forward biased dependent upon the condition of the bridge to effectively connect the capacitor and capacitance leg of said first circuit loop in parallel and the capacitor and capacitance leg of said second circuit loop in parallel.

9. A differential circuit for a bridge circuit energized by an alternating input signal and having a capacitance leg the combination comprising a circuit loop including the capacitance leg, a capacitor and a diode; a biasing circuit for said diode including a choke coil connected to said diode and said capacitor; means providing two direct current voltages which differ in magnitude; means connecting one of said direct current voltages to one end of said biasing circuit and means responsive to a predetermined condition of the bridge controlling the application of the other of said voltages to the other end of said biasing circuit whereby said diode is forward biased to effectively connect said capacitor in parallel with the capacitance leg dependent upon the condition of the bridge.

10. A differential circuit for a bridge circuit energized by an electrical alternating input signal and having a capacitance leg the combination comprising a circuit loop including the capacitance leg, a capacitor and a diode; means providing two direct current voltages differing in magnitude; means applying one of said direct current voltages to one side of said diode; means responsive to a predetermined condition of the bridge controlling the application of the other of said voltages to the other side of said diode whereby said diode is forward biased to effectively connect said capacitor in parallel with the capacitance leg dependent upon the condition of the bridge.

11. A differential on-off controller including an oscillator-rectifier having a feedback circuit including a capacitance bridge, said oscillator-rectifier having an output signal the magnitude of which varies in proportion to the unbalance of said capacitance bridge; said capacitance bridge having two series connected capacitance legs; a circuit loop including one of said capacitance legs, a capacitor and a diode; means providing two direct current voltages differing in magnitude; means applying one of said direct current voltages to one side of said diode; a bistable circuit having two stable states of operation; means connecting said output signal of said oscillator-rectifier to said bistable circuit whereby the state of operation of said bistable circuit is determined by the magnitude of said output signal; a load circuit connected between said bistable circuit and the larger of said direct current voltages whereby the voltage at the bistable circuit end of said load circuit is less than the larger of said direct current voltages by at least the voltage drop across said load circuit when said bistable circuit is in one of its stable states and is increased by said voltage drop when said bistable circuit is in the other of its stable states; means connecting the bistable circuit end of said load circuit to the other side of said diode whereby said diode is forward biased dependent upon the state of operation of said bistable circuit to effectively connect said capacitor in parallel with said one capacitance leg thereby changing the condition of said bridge.

12. A differential on-off controller including an oscillator-rectifier having a feedback circuit including a capacitance bridge, said oscillator-rectifier having an output signal the magnitude of which varies in proportion to the unbalance of said capacitance bridge; said capacitance bridge having two series connected capacitance legs; a circuit loop including one of said capacitance legs, a capacitor and a diode; means providing a direct current voltage; means applying said direct current voltage to one side of said diode; a bistable circuit having two stable states of operation which are indicated by the direct current voltage presented at its output, said voltage presented at its output being greater than said first mentioned direct current voltage only when said bistable circuit is in one of said stable states of operation; means connecting said output signal of said oscillator-rectifier to said bistable circuit whereby the state of operation of said bistable circuit is determined by the magnitude of the output signal of said oscillator-rectifier; means connecting the output of said bistable circuit to the other side of said diode whereby said diode is forward biased dependent upon the state of operation of said bistable circuit to effectively connect said capacitor in parallel with said one capacitance leg thereby changing the condition of the bridge.

13. A differential on-off controller including an oscillator-rectifier having a feedback circuit including a capacitance bridge, said oscillator-rectifier having an output signal the magnitude of which varies in proportion to the unbalance of said capacitance bridge; said capacitance bridge having two series connected capacitance legs; a circuit loop including one of said capacitance legs, a capacitor and a diode; a biasing circuit for said diode including a choke coil; means providing a direct current voltage; means applying said direct current voltage to one end of said biasing circuit; a bistable circuit having two stable states of operation which are indicated by the direct current voltage presented at its output, said voltage presented at its output being greater than said first mentioned direct current voltage only when said bistable circuit is in one of said stable states of operation; means connecting said output signal of said oscillator-rectifier to said bistable circuit whereby the state of operation of said bistable circuit is determined by the magnitude of the output signal of said oscillator-rectifier; means connecting the output of said bistable circuit to the other end of said biasing circuit whereby said diode is forward biased dependent upon the state of operation of said bistable circuit to effectively connect said capacitor in parallel with said one capacitance leg thereby changing the condition of said bridge.

14. A differential on-off controller including an oscillator-rectifier having a feedback circuit including a capacitance bridge, said oscillator-rectifier having an output signal the magnitude of which varies in proportion to the unbalance of said capacitance bridge; said capacitance bridge having two series connected capacitance legs; a circuit loop including one of said capacitance legs, a capacitor and a diode; means providing a direct current voltage; means applying said direct current voltage to one side of said diode; and means connected to said oscillator-rectifier and the other side of said diode providing a direct current voltage to said other side of said diode having a magnitude in excess of said first-mentioned direct current voltage, said last-mentioned means providing said direct current voltage only in response to the output signal of said rectifier-oscillator having a predetermined magnitude whereby said diode is forward biased dependent upon the magnitude of the output signal of said oscillator-rectifier to effectively connect said capacitor in parallel with said one capacitance leg thereby changing the condition of said bridge.

15. A differential on-off controller including an oscillator-rectifier having a feedback circuit including a capacitance bridge, said oscillator-rectifier having an output signal the magnitude of which varies in proportion to the unbalance of said bridge; said capacitance bridge having two series connected capacitance legs; a circuit loop including one of said capacitance legs, a capacitor and a diode; means providing a first direct current voltage; a biasing circuit for said diode including a choke coil; means applying said first direct current voltage to one end of said biasing circuit; and means connected to said oscillator-rectifier and the other end of said biasing circuit providing a second direct current voltage having a magnitude in excess of said first direct current voltage, said last-mentioned means providing said direct current voltage only in response to the output signal of said rectifier-oscillator having a predetermined magnitude whereby said diode is forward biased dependent upon the magnitude of the output signal of said rectifier-oscillator to effectively connect said capacitor in parallel with said one capacitance leg thereby changing the condition of said bridge.

References Cited by the Examiner

UNITED STATES PATENTS 3,081,422 3/1963 Cooper ---------- 331—172 X

OTHER REFERENCES

Dromgoole: "A Simple Stable Capacitance Operated Relay . . . ," Electronic Engineering (mag.), 10–54 (pp. 454–455 relied on).

ARTHUR GAUSS, *Primary Examiner.*